United States Patent
Garner et al.

(10) Patent No.: US 9,017,759 B2
(45) Date of Patent: Apr. 28, 2015

(54) GLASS SUBSTRATE COMPRISING AN EDGE WEB PORTION

(75) Inventors: Sean M. Garner, Elmira, NY (US); Gary E. Merz, Rochester, NY (US)

(73) Assignee: Corning Incorporated, Corning, NY (US)

( * ) Notice: Subject to any disclaimer, the term of this patent is extended or adjusted under 35 U.S.C. 154(b) by 341 days.

(21) Appl. No.: 13/529,200

(22) Filed: Jun. 21, 2012

(65) Prior Publication Data

US 2012/0258584 A1 Oct. 11, 2012

Related U.S. Application Data

(62) Division of application No. 12/511,167, filed on Jul. 29, 2009.

(51) Int. Cl.
*B65B 33/00* (2006.01)
*B05D 3/12* (2006.01)
*B32B 17/06* (2006.01)

(52) U.S. Cl.
CPC ..................................... *B32B 17/06* (2013.01)

(58) Field of Classification Search
CPC ........... B65H 23/0208; B65H 23/0322; B65H 2301/442; B65H 2301/4423; B65H 2301/4422; B65H 2701/131; B65H 2701/1315; B32B 17/06
USPC ................. 427/154, 178; 428/425.6, 426, 441
See application file for complete search history.

(56) References Cited

U.S. PATENT DOCUMENTS

| | | | |
|---|---|---|---|
| 4,322,656 A | 3/1982 | Huber et al. | 313/485 |
| 4,369,905 A * | 1/1983 | Tokuno | 226/17 |
| 4,945,252 A * | 7/1990 | Lerner et al. | 250/548 |
| 5,220,358 A | 6/1993 | Brown et al. | 351/159 |
| 5,585,188 A * | 12/1996 | Cheron et al. | 428/426 |
| 5,868,603 A * | 2/1999 | Allaire et al. | 451/29 |
| 6,182,940 B1 | 2/2001 | Miyamoto et al. | 248/682 |
| 6,592,969 B1 | 7/2003 | Burroughes et al. | 428/195.1 |
| 6,689,626 B2 | 2/2004 | Krijn et al. | 438/22 |
| 6,815,070 B1 * | 11/2004 | Burkle et al. | 428/425.6 |
| 6,853,123 B1 | 2/2005 | Nattermann et al. | 313/483 |
| 7,165,323 B2 * | 1/2007 | Halsey et al. | 29/846 |

(Continued)

FOREIGN PATENT DOCUMENTS

| | | |
|---|---|---|
| EP | 0 528 112 | 5/1992 |
| EP | 1 803 601 | 12/2006 |

(Continued)

OTHER PUBLICATIONS

Extended Supplementary European Search Report; EPO dated: Jun. 26, 2014.

*Primary Examiner* — Michael Wieczorek
(74) *Attorney, Agent, or Firm* — Kevin M. Able

(57) ABSTRACT

A glass ribbon coated with a flexible material, the flexible coating forming a flexible web portion that extends from an edge of the glass ribbon at least one millimeter. The flexible web portion can be used to facilitate handling of the glass ribbon in a manufacturing process, and may include registration markings, or perforations, that further facilitate precise positioning of the ribbon.

21 Claims, 3 Drawing Sheets

(56) References Cited

U.S. PATENT DOCUMENTS

| | | |
|---|---|---|
| 7,201,949 B2* | 4/2007 | Houghtaling et al. ......... 428/1.1 |
| 7,318,958 B2 | 1/2008 | Wang .......................... 428/412 |
| 2003/0158076 A1* | 8/2003 | Rodrigues ................... 510/475 |
| 2005/0053768 A1 | 3/2005 | Friedman et al. ............. 428/167 |
| 2005/0142321 A1 | 6/2005 | Miyahara et al. ............ 428/64.2 |
| 2007/0144656 A1 | 6/2007 | Muromachi et al. .......... 156/108 |
| 2008/0037141 A1 | 2/2008 | Tom et al. .................... 359/813 |
| 2008/0083288 A1* | 4/2008 | Glaesemann .................. 73/849 |
| 2010/0242546 A1* | 9/2010 | Tsuji et al. .................. 65/370.1 |
| 2010/0276066 A1 | 11/2010 | Kondo .......................... 156/101 |

FOREIGN PATENT DOCUMENTS

| | | |
|---|---|---|
| EP | 2218691 A1 * | 8/2010 |
| GB | 1163999 A | 1/1969 |
| JP | 2861906 | 12/1998 |
| JP | 11-171595 | 6/1999 |
| JP | 2002-037374 | 2/2002 |
| WO | WO 2008/104825 | 9/2008 |
| WO | WO 2008/136872 | 11/2008 |
| WO | WO 2009057450 A1 * | 5/2009 |

* cited by examiner

GLASS SUBSTRATE COMPRISING AN EDGE WEB PORTION

CROSS-REFERENCE TO RELATED APPLICATIONS

This is a divisional of U.S. patent application Ser. No. 12/511,167 filed on Jul. 29, 2009, the content of which is relied upon and incorporated herein by reference in its entirety, and the benefit of priority under 35 U.S.C. §120 is hereby claimed.

TECHNICAL FIELD

This invention is directed to a thin glass substrate comprising a web portion extending beyond at least one of the edges of the glass substrate to facilitate handling and/or conveying and/or positioning the substrate.

BACKGROUND

Thin glass substrates can be used in a variety of applications, including so-called "e-paper" and touch sensors. The glass for such substrates can be quite thin, typically less than about 0.3 mm. The processing of the substrates can be performed on an individual glass sheet basis, or most efficiently by conveying the substrate as a long glass ribbon wound on a roll. The method includes dispensing the ribbon from one roll, processing the dispensed portion, then winding the ribbon onto a take-up roll.

One drawback to a so-called "roll-to-roll" process is the fragility of the thin glass ribbon—mechanical contact of the ribbon during handling can lead to damage, including scratches, chipping and in the worst case, fracture. What is needed is a glass substrate, in either sheet or ribbon form, that can be safely handled without damaging the glass.

SUMMARY

A glass substrate is described that includes a coating material disposed thereon that extends from at least one edge of the substrate as a web portion that facilitates handing and/or conveying of the substrate without damage. The web portion of this handling coating is preferably flexible, and can be used to hold and/or convey and/or align the glass substrate for processing in a manufacturing step without the need to directly contact interior non-coated portions of the substrate. A method for holding, conveying and/or aligning the glass ribbon is also described.

In one embodiment, a glass substrate is described comprising first and second major surfaces and first and second edges, the first and second edges separated by a width W. The first and second edges are preferably substantially parallel with each other. The glass substrate includes a flexible coating disposed over at least a portion of the first and second major surfaces, and the coating comprises web portions extending from at least one of the first or second edge a distance of at least 1 mm.

The glass substrate may be in the form of a glass ribbon, or an individual glass sheet and preferably has a thickness equal to or less than 0.3 mm The coating also comprises a web portion extending from the first edge of the glass substrate a distance of at least 1 mm and a web portion extending from the second edge a distance of at least 1 mm. The flexible coating may coat only a portion of either or both of the first and second major surfaces, or the flexible coating may extend across the entire width W of the glass substrate on either one or the other, or both of the major surfaces of the substrate.

The web portion extending from the at least one of the first or second edge of the glass substrate may comprise perforations for engaging with a sprocket or other toothed member. The toothed member may instead be a track that engages with the web portion.

A surface of the flexible coating that coats at least a portion of the first major surface of the glass substrate may include a non-planar shape complimentary to a non-planar shape of a surface of the flexible coating that coats at least a portion of the second major surface. For example, an upper portion of the coating on one side of a layer of glass may have a shape that is complimentary to the lower portion of the coating on another, adjacent layer of glass that aligns the glass layers, and preferably prevents the glass of one layer from contacting the glass of another adjacent layer.

The flexible coating may be adhered to the first and/or second major surfaces with an adhesive disposed between the coating and the glass substrate. The coating may further comprise strengthening members, such as fibers.

The web and non-web portions of the coating may include registration markings to aid in alignment or positioning of the glass substrate. In some embodiments, one or both of the first and second major surfaces of the glass substrate may include one or more layers of a laminating or deposited material. For example, the glass substrate may be coated with another material prior to the application of the web coating material. The other material may be a laminating material such as a barrier layer to prevent leaching of the glass. Additionally, after the application of the web and non-web portions of the handling coating, additional materials may be formed on the substrate, such as, for example, electrically functional materials that may comprise an electronic device (e.g. a semiconductor device). As used herein, an electrically functional device includes organic or inorganic semiconductor and/or conductor materials.

In another embodiment, a glass ribbon is described comprising first and second major surfaces and first and second edges and a polymer coating disposed over the first and second major surfaces and extending beyond the first and second edges a distance of at least 1 mm to form flexible web portions. The flexible web portions may comprise perforations that can be used to engage with teeth in a roller (sprocket) or a track. The flexible web portion(s) or non-web portions of the coating may comprise registration markings such as lines or symbols for aligning the glass ribbon.

In still another embodiment, a method of conveying a glass ribbon is disclosed comprising dispensing a length of a glass ribbon from a first spool, the glass ribbon comprising a coating including a web portion extending from an edge of the ribbon at least 1 mm, engaging the web portion with a feed apparatus to convey the ribbon, the feed apparatus comprising a roller or track for engaging with the web portion, and collecting the dispensed ribbon by winding the dispensed ribbon onto a take-up spool. The web portion may comprise perforations, for engaging with the feed apparatus. For example, the feed apparatus may comprise sprockets, wherein the teeth of the sprocket engage with the perforations to transport the glass ribbon. However, the feed apparatus is not limited to sprockets, but may further include rollers or tracks for engaging with the web portion. In another example, pinch rollers may be used to engage with the web and/or non-web portion of the handling coating.

In some embodiments, the coating may include registration indicia, and the method further comprises detecting the indicia and positioning the ribbon in response to the detected indicia. The detecting can be performed by any suitable machine vision system as is known in the art for performing such tasks. If the glass ribbon is to be used for the manufacturing of electronic devices, the method may further comprise depositing an electrically functional material on at least a portion of the dispensed length prior to the collecting. For example, the glass ribbon is rolled off a first spool, the desired components are deposited on ribbon, and then the ribbon is collected by rolling the ribbon onto a second spool. The web portions may be removed from the ribbon after the depositing, leaving the interior portions of the ribbon undamaged.

The invention will be understood more easily and other objects, characteristics, details and advantages thereof will become more clearly apparent in the course of the following explanatory description, which is given, without in any way implying a limitation, with reference to the attached Figures. It is intended that all such additional systems, methods, features and advantages be included within this description, be within the scope of the present invention, and be protected by the accompanying claims.

DETAILED DESCRIPTION

Figure 1:
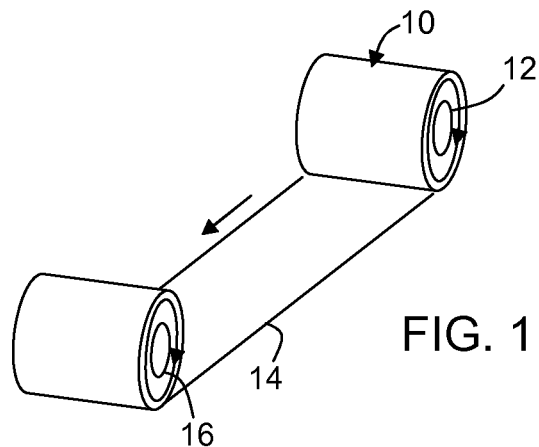
FIG. 1 a perspective view of a "roll-to-roll" process for conveying a glass ribbon.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

While glass is known as a brittle material, inflexible and prone to scratching, chipping and fracture, in glass having a thin cross section can in fact be quite flexible. One need only consider the flexibility of hair-thin strands of optical fiber. Similarly, in thin sheets or ribbons, glass can be wound and un-wound from rolls, much like paper or plastic film. However, even though glass can be made flexible, it retains its brittle characteristic, and can be damaged by contact. For certain applications, particularly those for which visual defects can be distracting (e.g. display applications), even minor, seemingly cosmetic defects are unacceptable. For other applications requiring high mechanical strength, defects even less than 1 um can limit the mechanical reliability of the glass article. Thus, handling of the sheets in a manufacturing process, for example the depositing of thin film devices on the sheet, can become a source of loss and high cost.

Although glass can be processed on an individual sheet basis, a method contemplated herein, a more efficient method involves starting with a thin ribbon of glass wound on a roll as illustrated in FIG. 1. As glass ribbon 10 is un-wound from the roll 12, the un-wound or dispensed portion 14 can be processed, and then re-wound on a second "take-up" roll 16. In this context, the term "processed" can include any step subsequent to the formation of the glass, including but not limited to grinding, polishing, cleaning, or the deposition of additional layers and/or components (e.g. electrical/electronic components or portions thereof) on the glass. However, in some instances, the transport of the glass ribbon through the processing equipment can require precise positioning of the ribbon. For example, the formation of thin film devices (e.g. transistors, electroluminescent layers, etc.) on the glass substrate may require the ribbon to position, or index, between multiple stations or equipment placement, and require exacting registration from position to position. Performing this form of conveyance on a ribbon of glass less than 0.3 mm or less than 0.1 mm or less than 0.05 mm in thickness is difficult enough. Once the devices are formed, there is the problem of stacking or re-winding the ribbon for later use, perhaps in a subsequent manufacturing process, without damage to glass ribbon or the devices formed on one or both surfaces of the ribbon.

Figure 2A:
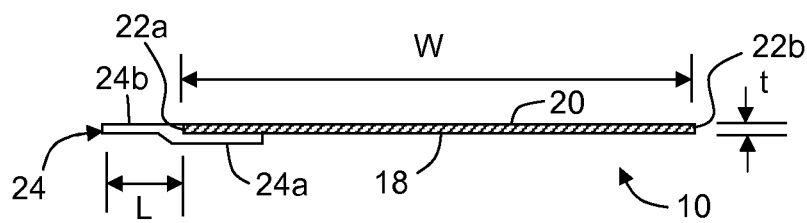
FIG. 2A-2B are cross sectional views of a glass substrate (glass sheet or glass ribbon) comprising a coating that includes a web portion along an edge of the substrate.

FIG. 2A illustrates an edge view of an embodiment of the present invention comprising glass substrate 10 (e.g. glass sheet or glass ribbon 10) shown extending into the figure) including a first major surface 18 and a second opposing major surface 20. The glass substrate is further bounded by first edge 22a and second edge 22b. Also shown is coating 24 that includes a section 24a that coats at least a portion of first major surface 18 and also a web portion 24b that extends from first edge 22a a minimum of at least 1 mm, preferably at least 2 mm, and more preferably at least 3 mm. In some embodiments the web portion or portions may extend up to 1 cm or more from the edge of the glass substrate. Web portion 24b thus provides a handling surface that can be contacted by handing equipment, such as rollers, without the need to physically contact the glass itself, and may further be used as an alignment aid should alignment with processing equipment be desired. Thus, in one embodiment, a glass substrate includes a coating or film that extends from an edge of the ribbon, and the extended portion of the coating or film can be used to support or convey the glass substrate without contact or damage to the substrate. For example, the extended portion of the coating can be gripped by rollers, engaged with sprockets, clamped or any other method of securing the extended portion of the coating. The glass substrate edges 22a and 22b need not be planar features as shown in FIG. 2A but may have out-of-plane features such as rounded edge bead features. Likewise, the coating web portion 24b could also possess non-planar features.

Figure 2B:

In another embodiment, depicted in FIG. 2B, a portion of both major surfaces 18 and 20 of the glass substrate are coated with coating 24. Conveying the glass substrate may include gripping the extended portion of the coating 24b as well as the coating portion 24a above the glass substrate.

Figure 3A:
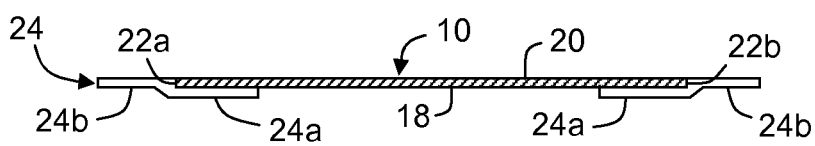
FIGS. 3A-3B are cross sectional views of a glass substrate (glass sheet or glass ribbon) comprising a coatings that includes web portions along two edges of the substrate.
Figure 3B:
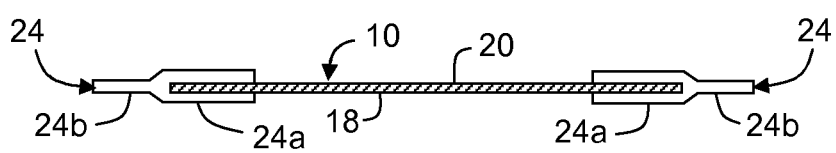

In still another embodiment illustrated in FIG. 3A, glass coating 24 may be applied to glass ribbon 10 so that a portion (24a) of coating 24 is applied to at least one major surface of glass ribbon 10 (e.g. surface 18), and another portion (24b) of coating 24 extends from edges 22a, 22b, respectively, by at least 1 mm. Alternatively, as shown in FIG. 3B, coating 24 may be applied to at least a portion of both major surfaces of ribbon 10 and the two web portions 24b extend from each of the first and second edges by at least 1 mm.

Figure 4:
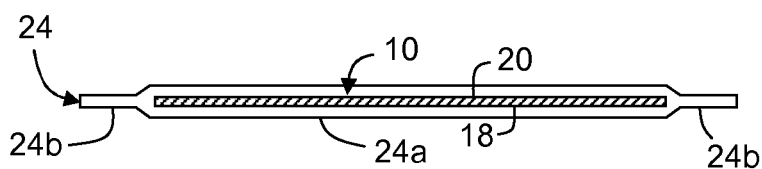
FIG. 4 depicts a cross sectional view of a glass substrate fully encapsulated by a coating that comprises two web portions along two edges of the substrate.

In some embodiments, it may be desirable that the coating material extend completely over the entirety of a least one (first or second) major surface. In this way, surfaces of adjacent glass layers are prevented from having direct contact with each other, and at least one extended portion (web) can be used to position or convey the glass as previously described. Thus, the glass may be encapsulated by a coating that extends from one or both edges, and which coating may cover one or both major sides of the glass. As depicted in FIG. 4, glass substrate 10 encapsulated by coating material 24 that covers both major surfaces 18, 20 with a first coating portion 24a. In this embodiment, the glass substrate is flanked by two extended coating web portions 24b that may be handled in a manner similar to the preceding embodiments.

Figure 5:
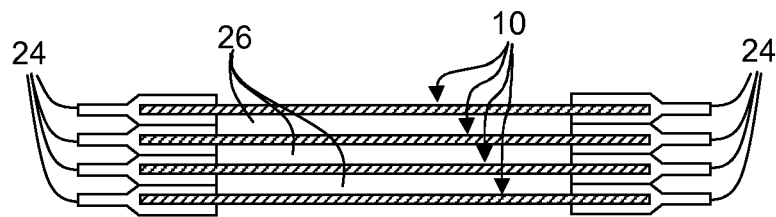
FIG. 5 is a cross sectional view of a stack (or roll) of glass sheets (or a rolled ribbon of glass) illustrating the formation of a gap between the layers that prevents contact between the glass layers.
Figure 6:
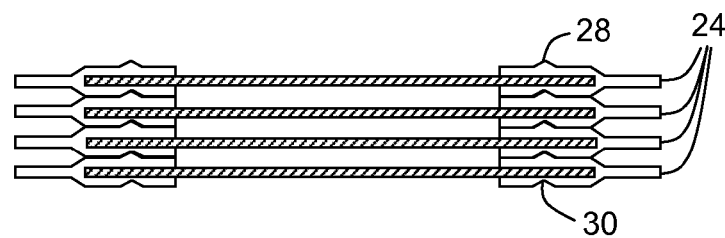
FIG. 6 is a cross sectional view of a stack (or roll) of glass sheets (or a rolled ribbon of glass) illustrating complimentary features in the upper and lower surfaces of the coating that facilitate mating and alignment of the layers.

As shown in FIG. 5, the thickness of the coatings can be selected to form a gap 26 between successive layers to prevent one layer of glass substrate to overlie another layer of glass substrate without allowing any one layer of glass to physically contact another layer of glass. In sheet form, thin glass panels may then be stacked one on top of another, and the thickness of the coating at the edges of the glass creates a gap between the glass panels so that the glass from one panel does not contact the glass of an adjacent panel. In ribbon form, the glass ribbon can be wound with similar effect—the glass from one layer of the wind can be prevented from contact the glass of a preceding layer of the wind. The winding may impart a bend radius of less than about 10 cm on the glass ribbon.

Where a ribbon is to be wound onto a spool or other take-up device, or one sheet is to be stacked onto another sheet, surfaces of the coating can be molded to include physically complementary features, as depicted in FIG. 6. Not only can these complimentary features function to prevent contact between layers of glass, either in sheet or ribbon form, but these complimentary features can be used to align one layer of the ribbon over a previous layer during stacking or winding. Such complimentary features would typically comprise protrusions and complimentary indentations configured to receive the protrusions. For example, a protrusion 28 on the exposed surface on the upper surface of the substrate and a complimentary indentation 30 on the exposed surface of coating applied to a lower surface of the ribbon allow the substrate to be stacked or wound such that the complimentary features engage and help align the substrate during the stacking or winding process.

Figure 7:
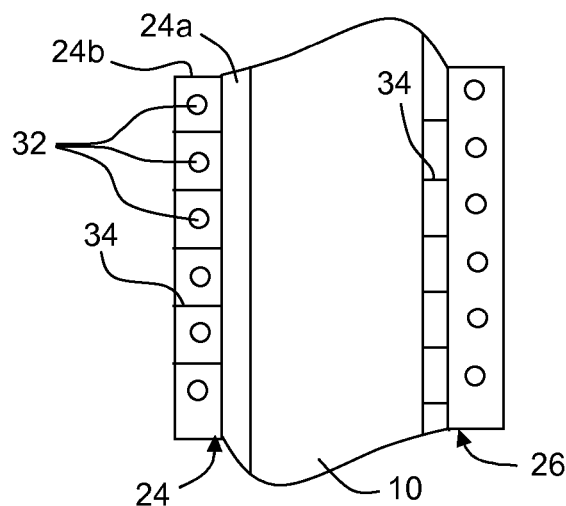
FIG. 7 is a top view of a portion of a glass substrate comprising a coating that includes web portions, wherein the web portions comprise perforations and indicia markings.
Figure 8:
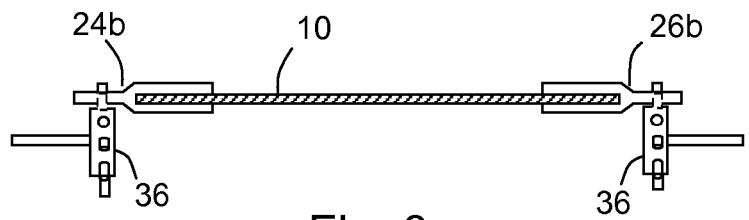
FIG. 8 is a side view showing sprockets being used to convey a glass substrate comprising a coating with web portions, wherein teeth of the sprocket engage with perforations in the web portions.

To facilitate positioning of the substrate, a web portion may include perforations 32 that allow engagement with a sprocket wheel, as shown in FIGS. 7 and 8. FIG. 8 illustrates the teeth of sprocket wheels 36 engaged with web portions 24b. A web portion may also include registration indicia 34, such as printed or machined markings (lines, circles or the like) that indicate specific locations along the ribbon and preferably are readable by machine vision systems. Furthermore, the perforations themselves may be utilized as indicia. However, the use of indicia need not be limited to a web portion, and may be placed on any portion of the coating to indicate position not only in a length-wise fashion, but across the width of the ribbon if so desired. That is, an indicia line can run transverse or parallel with the ribbon. It should be noted that the use of perforations and indicia is not limited to the use of glass ribbons, but may be employed as well with individual glass sheets or panels.

Figure 9:
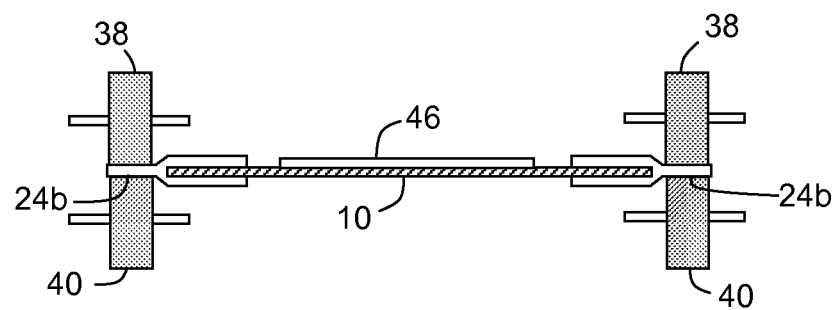
FIG. 9 is a cross sectional view of a glass substrate being conveyed by pinch rollers that engage web portions of the coating.
Figure 10:
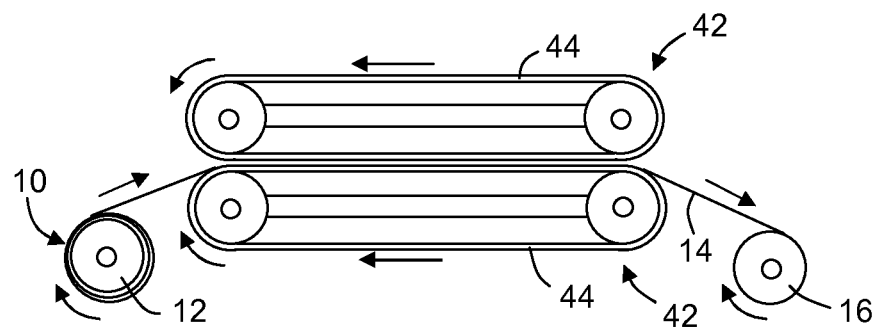
FIG. 10 is a side view of a glass ribbon being conveyed by tractor assemblies that engage with the web portions of a coating on the ribbon, including a payoff roll and a take up roll.

FIGS. 9 and 10 illustrate several alternative conveyance methods. For example, FIG. 9 shows the substrate being conveyed by pinch rollers 38, 40 wherein upper rollers 38 and lower rollers 40 pinch web portions 24b between the two roller sets.

FIG. 10 shows a side view of two tractor assemblies 42 that comprise belts 44 that pinch the web portions of the substrate between the belts. FIG. 10 depicts glass ribbon 10 that is undergoing winding from first roll 12 to a second roll 16.

The coating can be applied as a liquid to the glass (ribbon or sheet) or as a pre-formed film. Suitable pre-formed films can be polymers, for example, silicone or polyimide. The choice of material can be selected to be compatible with the contemplated processing. Kapton® tape with an acrylic adhesive with a total thickness preferably in the range between about 50 μm and 100 μm (e.g. 63.5 microns), for example, has been shown to be a suitable pre-formed tape that can be applied to glass in a manner as described above, and that allows vacuum processing of the ribbon at temperatures as high as 300° C. In some instances a metal coating may also be used, either separately or in combination with a polymer. For example, the coating may be a laminated coating. Pre-formed films or coatings may be applied with an adhesive, such as an acrylic adhesive.

To provide increased strength, the web portions may include strengthening members. For example, a preformed tape may include glass or polymer fibers (e.g. Kevlar® fibers to provide additional strength to the coating material.

The glass substrate may be laminated or coated with a laminating or deposited material prior to the application of the web and non-web portions of the handling coating. For example, a barrier or other protective layer may be applied to the substrate prior to the application of the handling or conveyance coating 24. The laminating or coated material may be an organic material or an inorganic material, as needed.

Once the handling coating has been applied, additional materials may be formed on the substrate, such as electrically functional materials. For example, the substrate may be in the form of a glass ribbon comprising handing coating 24 wound on a first spool (see FIG. 1). The glass ribbon is unwound from the first spool and conveyed in a manner as described above (see FIGS. 7-10 for example). The ribbon is then collected and wound onto a second spool. The dispensed portion of the ribbon between the first and second spools may be further processed, such as by the deposition of one or more electrically functional materials onto the ribbon. Such deposition may be accomplished by conventional methods (e.g. a photolithography method). For example, FIG. 9 shows ribbon 10 having electrically functional material 46 deposited thereon.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A method of processing a glass ribbon comprising:
dispensing a length of a glass ribbon wound on a first spool, the glass ribbon having a thickness equal to or less than 0.3 mm and a polymeric web portion extending from an edge of the glass ribbon;
engaging the polymeric web portion at a location interior to an outermost peripheral edge of the polymeric web portion with a feed apparatus;
processing the dispensed length of the glass ribbon; and
winding the dispensed length of the glass ribbon on a second spool.

2. The method according to claim 1, wherein the processing comprises depositing a semiconductor material on the glass ribbon.

3. The method according to claim 1, wherein the processing comprises depositing at least one of an organic semiconductor material and an organic conductor material on the glass ribbon.

4. The method according to claim 1, wherein the feed apparatus comprises rollers that engage the polymeric web portion at the location interior to the outermost peripheral edge of the polymeric web portion.

5. The method according to claim 1, wherein the feed apparatus comprises belts that engage the polymeric web portion at the location interior to the outermost peripheral edge of the polymeric web portion.

6. The method according to claim 1, further comprising removing the polymeric web portion after the processing.

7. The method according to claim 1, wherein the polymeric web portion comprises a polymeric tape.

8. The method according to claim 7, wherein a thickness of the polymeric tape is between 50 μm and 100 μm.

9. The method according to claim 1, wherein the polymeric web portion comprises perforations along a length of the glass ribbon, the perforations being arranged between the outermost peripheral edge of the polymeric web portion and the edge of the glass ribbon.

10. The method according to claim 9, further comprising engaging the perforations with a sprocket.

11. The method according to claim 1, wherein the glass ribbon comprises a coating, the coating comprises the polymeric web portion, and the coating comprises indicia, the method further comprising detecting the indicia and positioning the glass ribbon in response to the detected indicia.

12. The method according to claim 1, wherein the second spool comprises a plurality of layers of glass ribbon, and wherein a gap exists between the glass of one glass ribbon layer and the glass of an adjacent glass ribbon layer.

13. The method according to claim 1, wherein the glass ribbon comprises a flexible coating and the flexible coating comprises the polymeric web portion.

14. The method according to claim 13, wherein the flexible coating comprises a polymeric tape.

15. The method according to claim 14, wherein a thickness of the polymeric tape is between 50 μm and 100 μm.

16. The method according to claim 1, wherein the thickness of the glass ribbon is less than 0.1 mm.

17. The method according to claim 1, wherein the polymeric web portion comprises a polyimide tape.

18. The method according to claim 1, wherein the glass ribbon on the first or second spool comprises a bend radius less than 10 cm.

19. The method of processing a glass ribbon according to claim 1, wherein the polymeric web portion extends at least 1 cm from the edge of the glass ribbon.

20. The method of processing a glass ribbon according to claim 1, wherein the glass ribbon comprises a polymeric coating disposed on a first major surface and a second major surface of the glass ribbon, wherein interior portions of the glass ribbon are not coated with the polymeric coating, and wherein the polymeric coating comprises the polymeric web portion.

21. A method of processing a glass ribbon comprising:
dispensing a length of a glass ribbon wound on a first spool, the glass ribbon having a thickness equal to or less than 0.3 mm and polymeric web portions extending from edges of the glass ribbon, wherein the polymeric web portions comprise perforations along a length of the glass ribbon;
engaging the perforations with a sprocket;
processing the dispensed length of the glass ribbon; and
winding the dispensed length of the glass ribbon on a second spool.

* * * * *